UNITED STATES PATENT OFFICE.

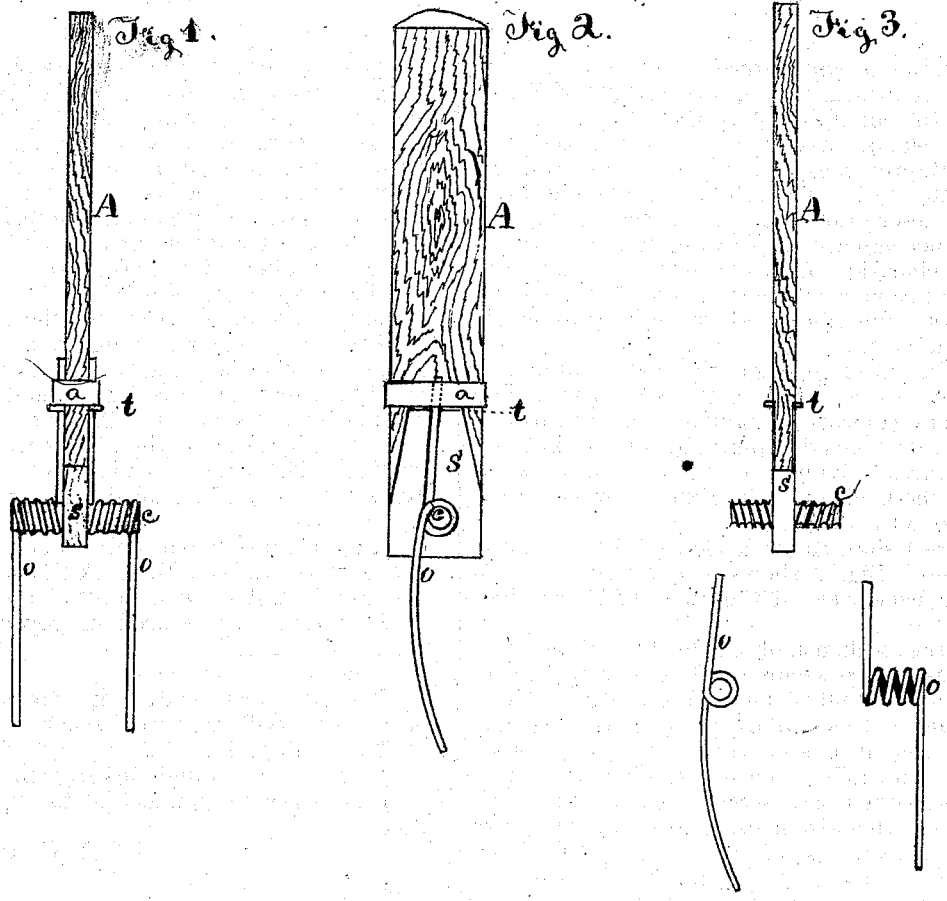

JOHN G. PERRY, OF KINGSTON, RHODE ISLAND.

IMPROVEMENT IN HAY-TEDDERS.

Specification forming part of Letters Patent No. 117,562, dated August 1, 1871.

*To all whom it may concern:*

Be it known that I, JOHN G. PERRY, of Kingston, in the county of Washington and State of Rhode Island, have invented certain new and useful Improvements in Hay-Tedder Forks; and do hereby declare the following to be a full and correct description thereof, reference being had to the accompanying drawing making part of this specification, and to the letters and numbers of reference marked thereon, similar letters and numbers being used in all the figures to denote the same part.

This invention relates to the mode of attaching the tines of the forks to the stocks that hold them; and consists in making a screw-thread on the pin that holds the spiral part of the tine, into which thread the wire of the tine is screwed; also, in the mode of holding the upper end of the tine above the spiral.

Figure 1 shows a back view of the stock and fork-tines. Fig. 2 shows a side view. Fig. 3 shows a back view of the stock with the tines separated.

A is the stock, usually made of wood, to which the tines *o o* are secured. S is a metallic cap, into which the end of the stock A is fitted. Upon each side of this cap are projections *c c*, which may be cast in one piece with the cap S; also, may be made hollow to lessen the weight. Upon these projections are screw-threads, which may be cast or otherwise made, and into the hollows of these threads the wire bodies of the tines *o o* are fitted, so that, by turning the tines around on the projections *c c* in the proper direction, they will be screwed close up to the sides of the stocks, where the upper ends of the tines will rise up onto the turned ends of the plates S and spring down into the notches *t t*, in which notches the spring of the wire will tend to hold them; but to make it more sure a band or ring, *a*, may be slid down the stock over the ends of the wires. This makes a very good support for the stocks and a very secure way to hold the forks or tines to the stocks, and at the same time allows them to be easily taken off, if broken or bent, by slipping the ring *a* up off the ends of the tines, which may then be sprung up out of the notches in which they lie, and by turning around they will be screwed off. Each turn of the thread on the projection *c* serves as a collar to hold the fork-tine on. At the same time the tine has full opportunity to spring and yield if it strikes any obstruction. The screw-threads on one side of the stock are made right-handed and on the other side left-handed.

Instead of the above-described mode of securing the upper ends of the fork-tines, they may be turned in and enter a hole or recess in the cap S or stock, or secured in any other way equivalent thereto.

I claim as my invention—

1. The screw or threaded pin *c* for holding the tines, substantially as herein set forth.

2. The combination of the band or ring *a* with the stock A, tine *o*, and holding-pin *c*, with or without a screw-thread, as and for the purpose stated.

JOHN G. PERRY.

Witnesses:
JOSEPH C. CLARKE,
M. F. PERRY.